(12) United States Patent
Yi (10) Patent No.: US 9,850,680 B1
(45) Date of Patent: Dec. 26, 2017

(54) RETRACTABLE UMBRELLA

(71) Applicant: Hyon Sam Yi, Anaheim, CA (US)

(72) Inventor: Hyon Sam Yi, Anaheim, CA (US)

(*) Notice: Subject to any disclaimer, the term of this patent is extended or adjusted under 35 U.S.C. 154(b) by 0 days.

(21) Appl. No.: 15/437,883

(22) Filed: Feb. 21, 2017

(51) Int. Cl.
*E04H 15/06* (2006.01)
*B60J 11/06* (2006.01)
*E04H 15/34* (2006.01)
*E04F 10/00* (2006.01)

(52) U.S. Cl.
CPC .............. *E04H 15/34* (2013.01); *B60J 11/06* (2013.01); *E04F 10/00* (2013.01); *E04H 15/06* (2013.01)

(58) Field of Classification Search
CPC ......... E04H 15/06; E04H 15/02; E04H 15/08; E04H 15/48; E04H 15/38; E04H 15/16; B60J 11/08; B60J 1/2063; B60J 11/00; B60J 11/06; B60J 3/002
USPC .. 135/88.01, 88.07, 88.13, 88.14, 88.16, 90, 135/96; 296/95.1, 99.1, 97.1, 136.05, 296/163; 160/370.22
See application file for complete search history.

(56) References Cited

U.S. PATENT DOCUMENTS

| | | | | |
|---|---|---|---|---|
| 3,137,491 A * | 6/1964 | Coenen | .................... | B60J 7/057 296/223 |
| 4,848,827 A * | 7/1989 | Ou | .......................... | B60J 11/00 135/88.07 |
| 5,230,545 A * | 7/1993 | Huang | ..................... | B60J 11/00 160/370.21 |
| 6,206,451 B1 * | 3/2001 | Maano | ..................... | B60J 11/00 296/136.04 |
| 6,782,904 B2 * | 8/2004 | Tien | ......................... | B60J 11/00 135/88.01 |
| 6,783,174 B2 * | 8/2004 | Bohm | ..................... | B60J 7/0573 296/223 |
| 7,571,691 B2 * | 8/2009 | Russikoff | ................ | B63B 17/02 114/361 |
| 7,780,220 B2 * | 8/2010 | Aqeel | ...................... | B60J 11/00 296/136.01 |
| 2006/0076805 A1 * | 4/2006 | Santaolalla Gil | ...... | B60J 7/0015 296/214 |
| 2011/0088855 A1 * | 4/2011 | Boustani | .................. | B60J 11/02 160/370.22 |
| 2017/0063290 A1 * | 3/2017 | Kurlagunda | ............ | H02S 20/30 |

* cited by examiner

*Primary Examiner* — Winnie Yip
(74) *Attorney, Agent, or Firm* — Louis F. Teran (57) ABSTRACT

The present invention relates to a retractable umbrella that can be attached above a door that opens to allow people to exit or enter an enclosure, such as, a bus, airplane, train, house, building, and the like. The retractable umbrella comprises several frames to which umbrella sheets are attached and that nest within one another within a housing that is attached to said enclosure. With a switch or button, a motor linearly displaces a shaft that displaces each of said frames out of the housing so as to provide protection for people from the rain as they exit or enter said enclosure.

6 Claims, 12 Drawing Sheets

RETRACTABLE UMBRELLA

BACKGROUND OF THE INVENTION

Field of the Invention

The present invention relates to generally to the field of retractable umbrellas that can be attached above a door that opens to allow people to exit or enter an enclosure, such as, a bus, airplane, train, house, building, and the like.

Description of the Prior Art

It is frequently desirable to use an umbrella when exiting an enclosure, such as a vehicle, bus, airplane, train, house, building, and the like, in the middle of rain. Although undesirable, exiting such enclosure in the middle of rain is often necessary and unavoidable. The problem is exacerbated when the person leaving said enclosure is carrying baggage or a child such that the person is unable to open and carry an umbrella.

Therefore, to avoid such undesirable situation and to prevent people from being drenched unnecessarily, there is a need for a retractable umbrella that can be attached above the door of the enclosure and automatically retracts when the door is opened so as to provide protection or shelter to the person exiting therefrom against the rain. In essences, there is a need for a retractable umbrella that prevents people exiting said enclosures from getting wet or drenched by rain.

Because of the clear need for such an umbrella, many attempts have been made to fulfill this need without success. U.S. Pat. No. 4,543,971 teaches the ejection and retraction of an umbrella inside an automobile but does not suggest the umbrella mounted on the outside of the vehicle. U.S. Pat. No. 5,188,331 teaches an umbrella support bracket but does not show an umbrella deployment mechanism. Australian Patent No. 237718 teaches an umbrella for a tractor that is always in an open configuration without a deployment mechanism.

Accordingly, it is desirable to provide a retractable umbrella that can be attached to the outside and above the door of an enclosure that would extend to an open configuration when the door is opened and retract back to a closed configuration when the door is closed. It is further desirable to provide a retractable umbrella that is easy to install and having a robust mechanism.

BRIEF SUMMARY OF THE INVENTION

Accordingly, the present invention has been made in view of the above-mentioned disadvantages occurring in the prior art, and it is the object of the present invention to provide a retractable umbrella that is installed outside and above the door of an enclosure, such as a bus, airplane, train, house, building, and the like.

It is another object of the present invention to provide a retractable umbrella that automatically extends to an open configuration whenever the door to said enclosure is opened and retracts to a closed configuration whenever the door to said enclosure is closed.

It is yet another object of the present invention to provide a retractable umbrella that has a robust sliding mechanism to allow multiple panels of the umbrella to slide to the extended or retracted position with reliability.

It is yet another object of the present invention to provide a retractable umbrella that is separated into a plurality of panels that retract into a low profile housing but extends a sufficient distance to provide proper coverage or protection from the rain.

To accomplish the above objects, the present invention is embodied in a retractable umbrella comprising a housing which encloses a motor that drives the extension and retraction of a right and left rail system to which a plurality of umbrella sheets are attached. In the closed configuration, the right and left rail systems are retracted fully into the housing. Additionally, the umbrella sheets are also retracted into the housing in an overlapping configuration, one on top of the other. This configuration allows the housing to be low profile. To extend to the open configuration, the motor pushes the right and left rail systems out of the housing so as to extend out the umbrella sheets a proper distance from the housing to provide sufficient coverage or protection from the rain. To facilitate the automation, the retractable umbrella of the present invention is electrically connected to an external battery for power and a switch for activation.

The above and other features and advantages of the present invention, as well as the structure and operation of various embodiments of the present invention, are described in detail below with reference to the accompanying drawings.

DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functional similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Certain terminology is used in the following description for convenience only and is not limiting. The words "right", "left", "lower", and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof, and words of similar import.

Although the present invention can be used in connection with an automobile, it is especially suited for applications in connection with doors that open to let people exit or enter an enclosure, such as a bus, airplane, train, house, building, and the like. Accordingly, the present invention will be described herein with reference to automobile applications, particularly for mounting the system to the roof of an automobile. However, the preferred system of the present application may also be adapted to a bus, airplane, train, building, house, and the like.

Reference will now be made to the drawings in which various elements of the present invention will be given numerical designations and I which the invention will be discussed so as to enable one skilled in the art to make and use the present invention.

The present invention comprises a retractable umbrella 100 that attaches to the roof 210 of an automobile 200 and having a housing 10, a motor 20, a switch 60, and a plurality of frames 30a, 30b, and 30c that comprise a plurality of umbrella sheets 70 each attached to a center rail 32a, 32b, and 33c at one end while the other end is attached to either a right rail 31a, 31b, and 31c or a left rail 33a, 33b, and 33c. It is well known that an automobile 200 has a door 220 that swings open to allow the driver or passenger to exit or enter. The retractable umbrella 100 of the present invention is attached to the roof 210 of said automobile 200 and allows an umbrella or canopy to extend outward to provide cover from the rain for the driver or passenger exiting or entering through said door 220.

Figure 1:
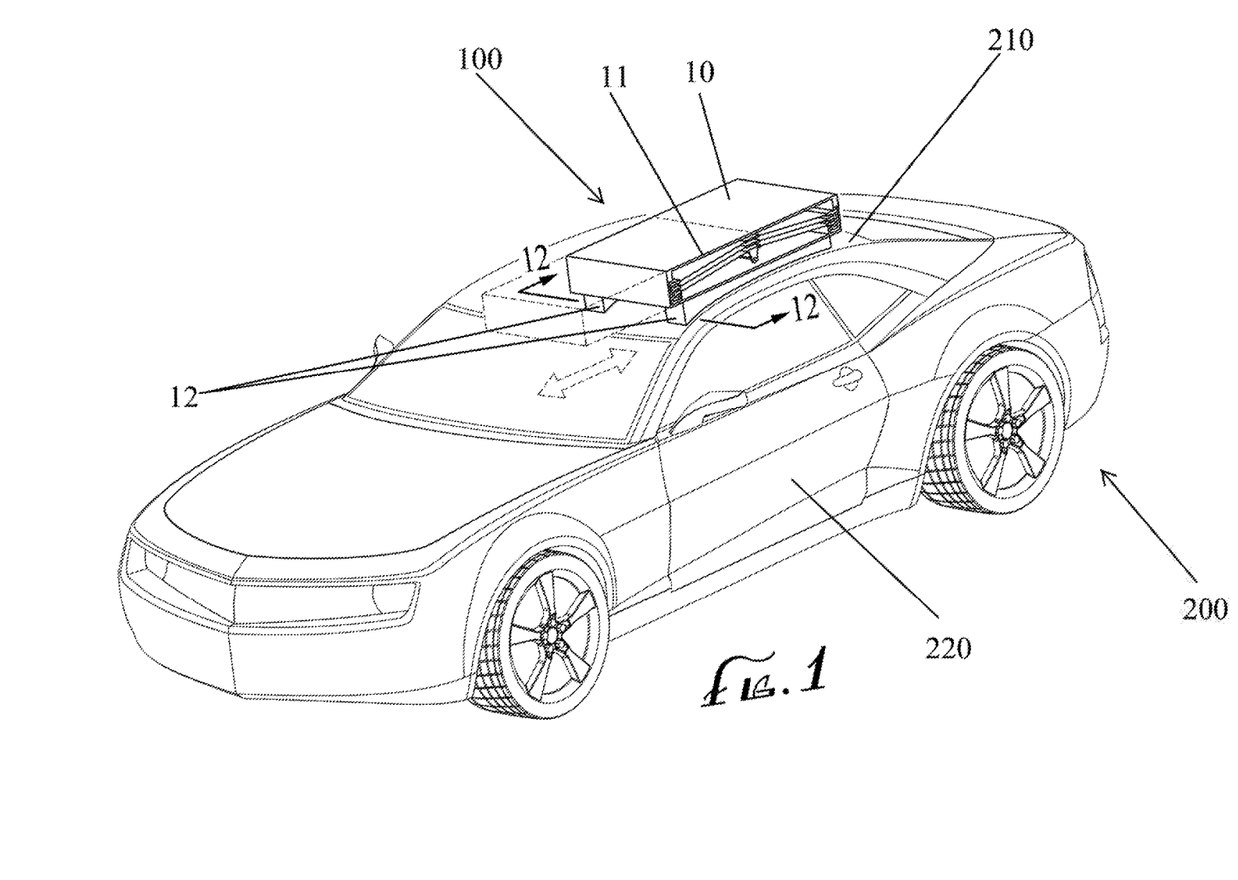
FIG. 1 shows a perspective view of a retractable umbrella according to the present invention installed on to a vehicle.
Figure 2:
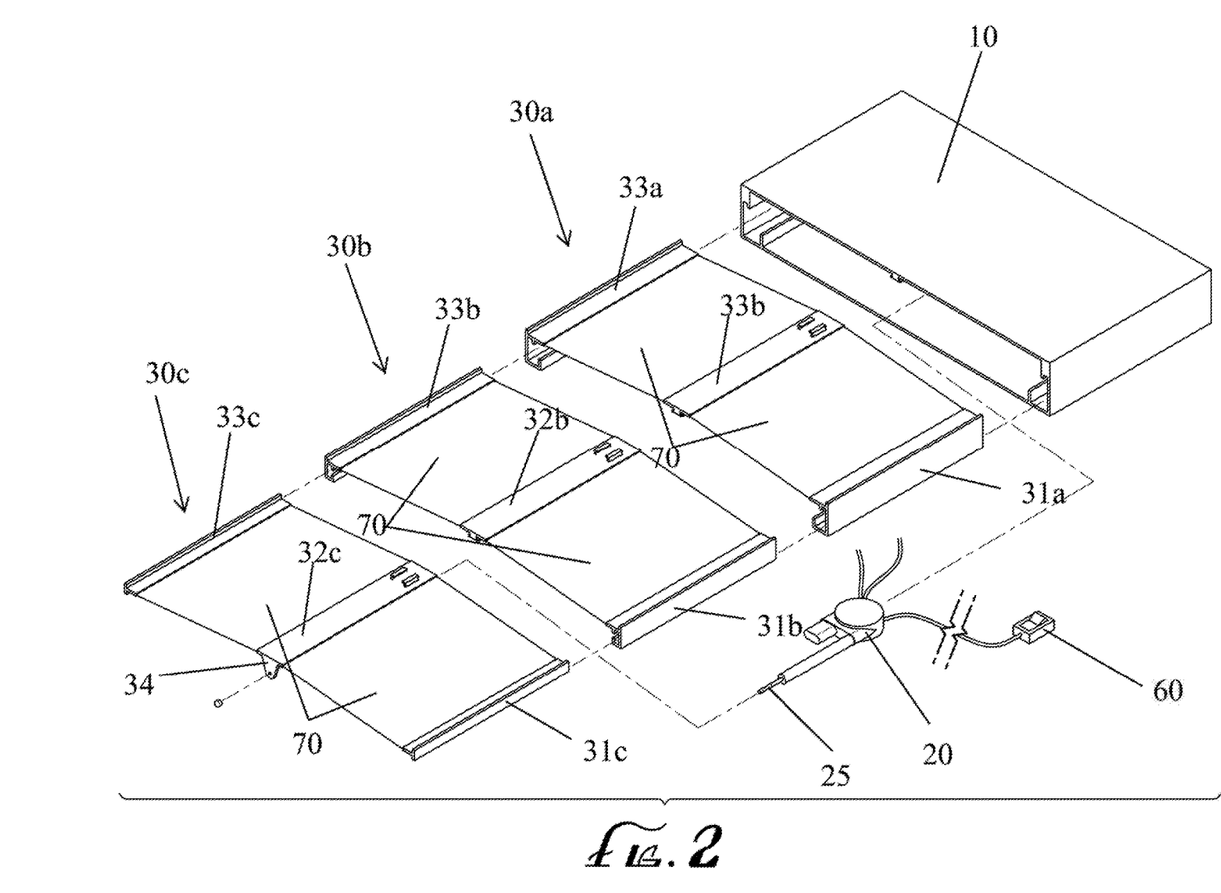
FIGS. 2 and 3 show an exploded views of a retractable umbrella according to the present invention.
Figure 3:
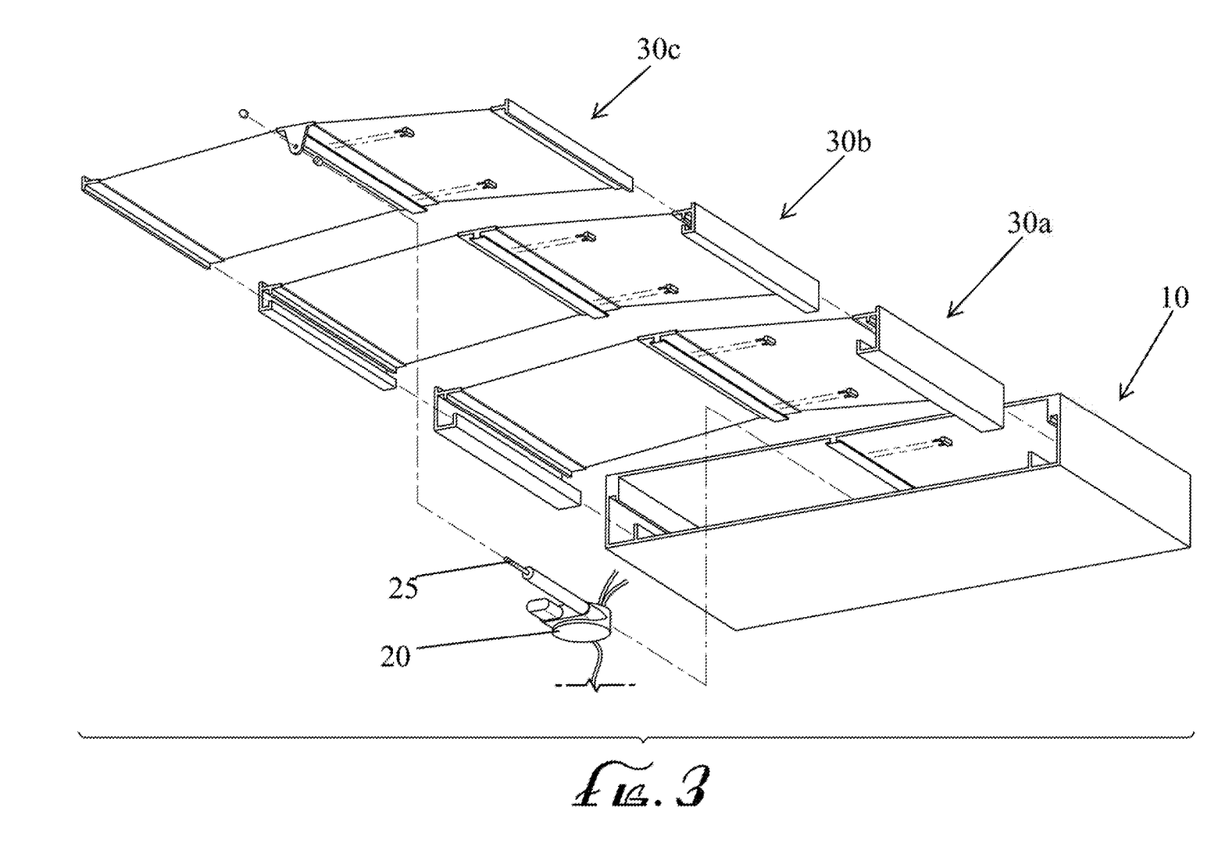

FIG. 1 shows a perspective view of the retractable umbrella 100 of the present invention in its assembled state as it would be installed onto the roof 210 of an automobile 200. FIGS. 2 and 3 show exploded views of the retractable umbrella 100 of the present invention to depict in greater detail the various components that comprise the retractable umbrella 100.

Figure 4:
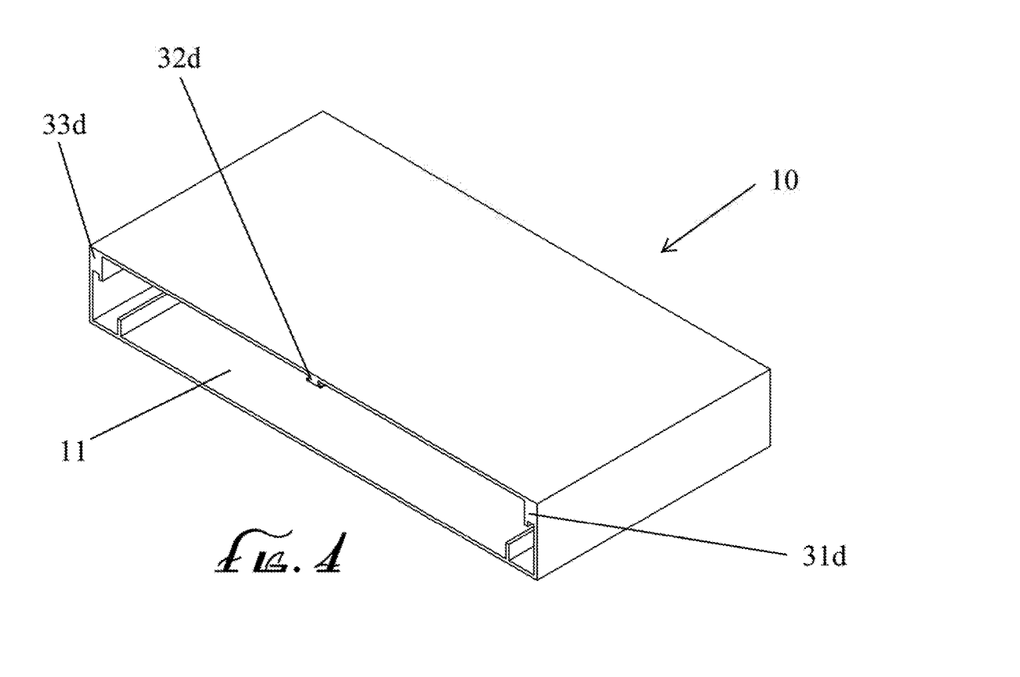
FIG. 4 shows a perspective view of a housing as used in a retractable umbrella according to the present invention.

As shown in FIG. 4, the housing 10 has a side opening 11 that faces towards a door 220 of the automobile 200 when attached to the roof 210 of the automobile 200. In the preferred embodiment, the side opening 11 faces the drivers' side door. In addition, the housing 10 has an attachment mechanism 12 to securely attach the housing 10 to the roof 210 of the automobile 200. Said attachment mechanism 12 can be a rail, a belt, strap, a snapping mechanism, or the like. In the preferred embodiment, the attachment mechanism 12 is a rail that attaches to the roof 210 with screws. Once securely attached to the roof 210, the housing 10 does not move or displace by the wind or drag forces generated when the automobile 200 travels at high rate of speed.

Figure 5:
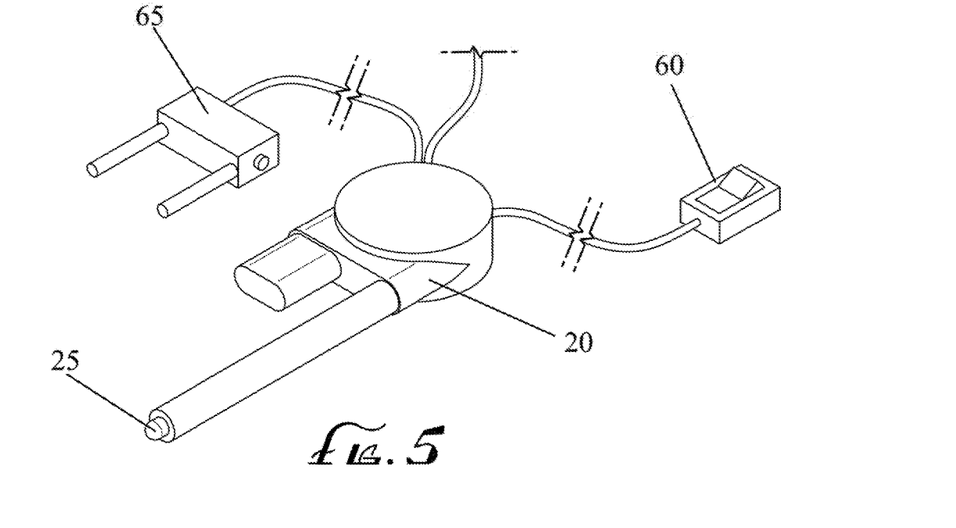
FIG. 5 shows a perspective view of a motor as used in a retractable umbrella according to the present invention.
Figure 6:
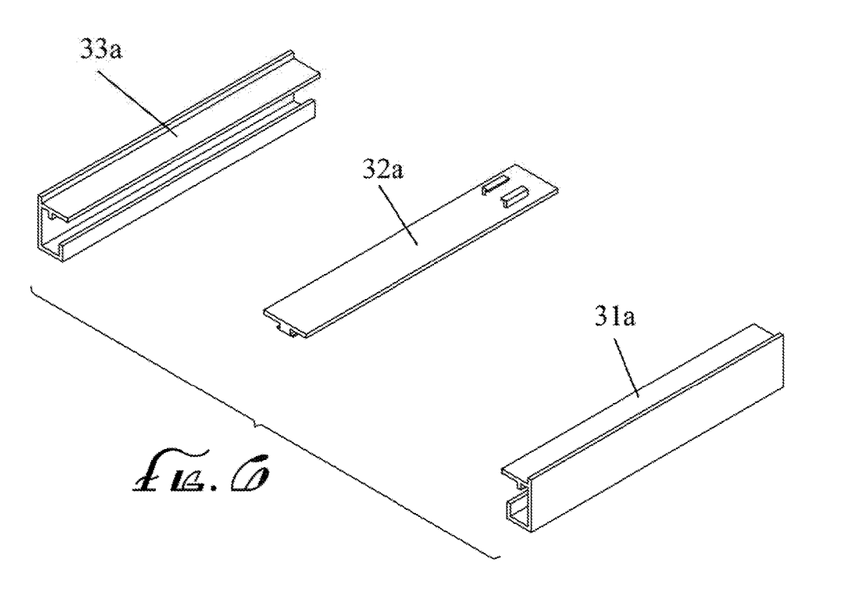
FIG. 6 shows a perspective view of the rails of a frame as used in a retractable umbrella according to the present invention.
Figure 7:
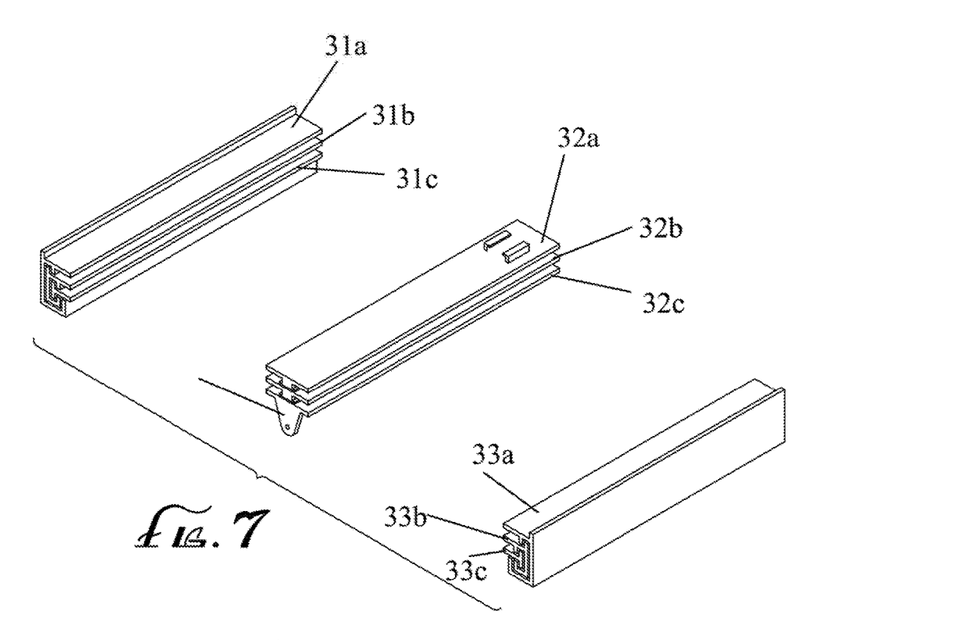
FIG. 7 shows a perspective view of a plurality of rails of a plurality of frames nesting one on top of another as used in a retractable umbrella according to the present invention.

As shown in FIG. 5, the motor 20 is a standard DC (direct current) motor. The motor 20 is attached to the inside of the housing 10. In the preferred embodiment, the motor 20 is attached to the lower plate of the housing 10, as shown in FIGS. 10a-10d. Power to the motor 20 can be supplied by a separate battery located inside the housing 10. However, in the preferred embodiment, the motor 20 is electrically connected to the battery of the automobile 200. Thus, in the preferred embodiment, the battery of the automobile 200 supplies the power to drive the motor 20 of the present invention.

In addition, a switch 60 is electrically connected to the motor 20, as shown in FIG. 5, so as to turn the motor 20 on or off. The switch 60 is a power switch that is able to activate the motor in a forward and backward direction, preferably, a toggle switch. In other words, the switch 60 has three (3) positions: a forward direction, a backward direction, and an off position. The switch 60 can ultimately be located anywhere within the automobile 200. In the preferred embodiment, the switch 60 is placed on the dashboard of the automobile 200 in the driver's side so that it may be accessible by the driver of the automobile 200.

As shown in FIG. 5, a retractable shaft 25 is attached to the motor 20. The motor 20 is configured to drive the displacement of the retractable shaft 25 in a forward or backward direction, depending on the position of the switch 60. The retractable shaft 25 is positioned perpendicular to the opening 11 of the housing 10, as shown in FIGS. 10a-10d. In the preferred embodiment, the end section of the retractable shaft 25 distal to the motor 20 has an external thread of standard size that can screw into a standard nut.

As shown in FIGS. 2 and 3, the retractable umbrella 100 of the present invention has a plurality of frames 30a, 30b, and 30c that nest within one another. In the preferred embodiment, the retractable umbrella 100 has three (3) frames 30a, 30b, and 30c that comprise three (3) right rails 31a, 31b, and 31c; three center rails 32a, 32b, and 32c; three (3) left rails 33a, 33b, and 33c, and six (6 umbrella sheets 70. The top frame 30a is the largest and comprises of the right rail 31a, center rail 32a, left rail 33a, and two (2) umbrella sheets 70. The mid frame 30b is smaller in size and comprises of the right rail 31b, center rail 32b, left rail 33b, and two (2) umbrella sheets 70. The bottom frame 30c is the smallest and comprises of the right rail 31c, center rail 32c, left rail 33c and two (2) umbrella sheets 70.

The configuration of the three frames 30a, 30b, and 30c in the preferred embodiment of the present invention is such that when the frames 30a, 30b, and 30c are nested, as shown in FIGS. 7 and 9a-9d, the right rails 31a, 31b, and 31c; the center rails 32a, 32b, and 32c; and the left rails 33a, 33b, and 33c are in alignment with one another, one on top of the other, and can slide between one another. Furthermore, when the frames 30a, 30b, and 30c extend, they do so in a linear direction that is perpendicular to the opening 11 of the housing 10, as shown in FIGS. 10a-10d.

Even further, umbrella sheets 70 attach to the frames 30a, 30b, and 30c as shown in FIGS. 2 and 3. In the preferred embodiment, each umbrella sheet 70 is rectangular in shape having two opposing sides that are attached to the frame 30a, 30b, and 30c. The attachments are along the right rails 31a, 31b, and 3c or left rails 33a, 33b, and 33c, and along the center rails 32a, 32b, and 32c. The attachment of the umbrella sheets 70 to the frames are such that prevents water from passing or dripping through. The material of the umbrella sheet 70 is non-porous so as to block any rain water from passing through. Additionally, the attachment of the umbrella sheet 70 to the frames is such that the umbrella sheet 70 is tightly stretched out so as to prevent any puddling of water thereon.

Hereinafter, an explanation on the methods of assembling the product of the present invention, the installation thereof to an automobile 200, and the operating states thereof will be given.

Figure 8:
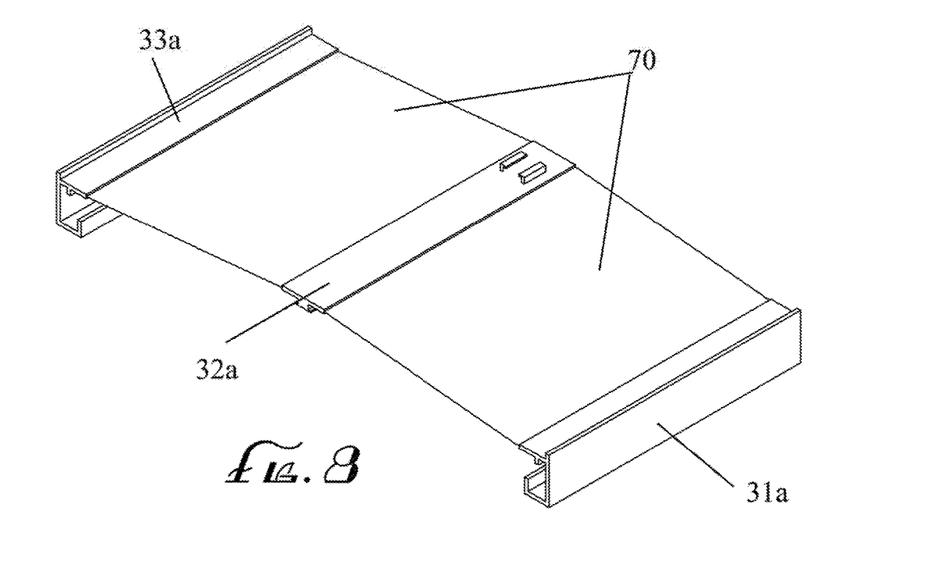
FIG. 8 shows a perspective view of a frame as used in a retractable umbrella according to the present invention.
Figure 9A:
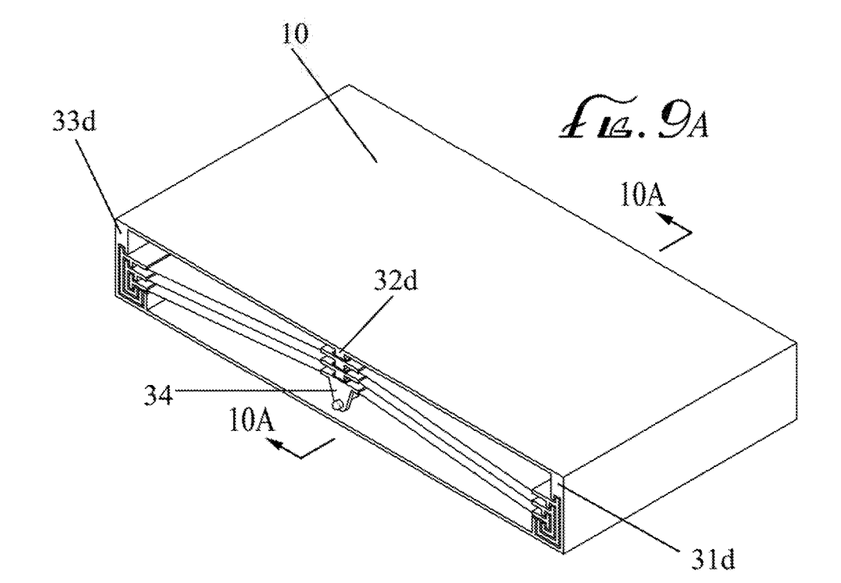
FIGS. 9a, 9b, 9c, and 9d show a perspective view of a plurality of frames extending out of a housing one after the other as used in a retractable umbrella according to the present invention.

For the assembly of the retractable umbrella 100 of the present invention, each umbrella sheet 70 is attached to a center rail 32a, 32b, and 32c and either a right rail 31a, 31b, and 31c or a left rail 33a, 33b, and 33c, as shown in FIG. 8. The right rails 31a, 31b, and 3c; left rails 33a, 33b, and 33c; and the center rails 32a, 32b, and 32c are then nested within one another, as shown in FIGS. 7 and 9a-9d. Thereafter, the nested rails are inserted into the housing 10. As the rails are inserted into the housing 10, the retractable shaft 25 is attached to a flap 34 at the distal end of the lowermost center rail 32c of the lowermost frame 30c, as shown in FIGS. 10a-10d. Assembly is complete when the nested rails are completely within the housing 10, as shown in FIG. 9a. The housing 10 of the preferred embodiment of the present invention has a right rail guide 31d, a left rail guide 33d, and a center rail guide 32d that guide and retain the rails therewithin. As such, the guides 31d, 32d, and 33d, in conjunction with the rails reduce the amount of wobbling or instability of the retractable umbrella 100.

Installation of the retractable umbrella 100 of the present invention requires the attachment of the housing 10 to the roof 210 of an automobile 200 with the side opening 11 facing a door 220, preferably the driver's door. Prior to attaching the housing 10 to the roof 210, it is preferred that the housing 10 enclose the motor 20 that is attached to the retractable shaft 25. Thereafter, the power supply wires from the motor 20 are electrically connected to a battery, preferably the battery of the automobile 200. Then the switch 60 that is electrically connected to the motor 20 is attached to the interior of the automobile 200, preferably to the dashboard where it is accessible by the driver.

Once the retractable umbrella 100 of the present invention is attached to the roof 210 of an automobile 200, the switch 60 can be pressed to allow the motor 20 to displace the retractable shaft 25 so that the rails and umbrella sheets 70 extend outward from the housing 10 or retract inward into the housing 10.

The external thread on the retractable shaft 25 extends a predetermined distance along the retractable shaft 25. In the preferred embodiment, the external thread on the retractable shaft 25 starts at the outermost end distal to the motor 20 and extends a short distance enough to allow the thread in the nut to engage with sufficient stability and rigidity.

Figure 9B:
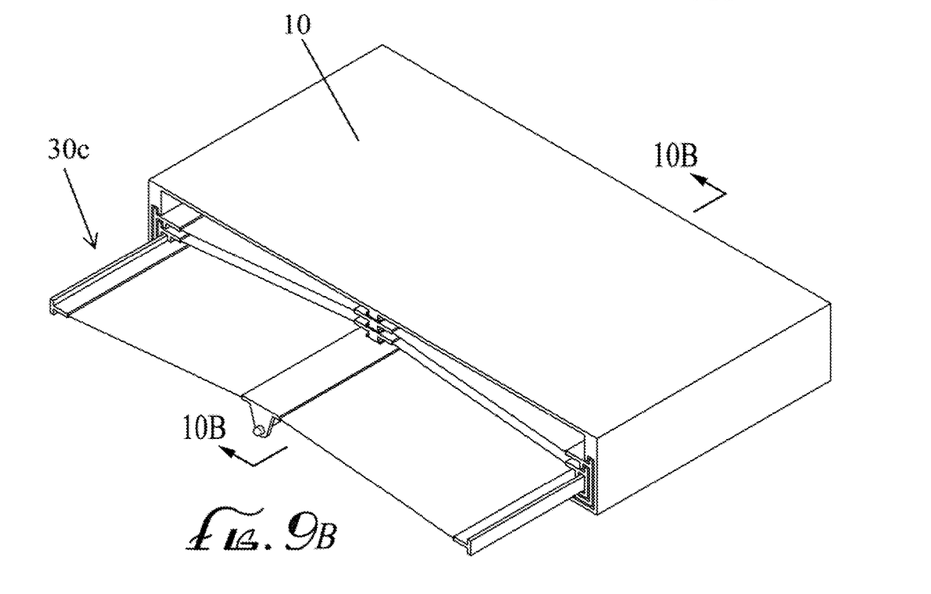
Figure 9C:
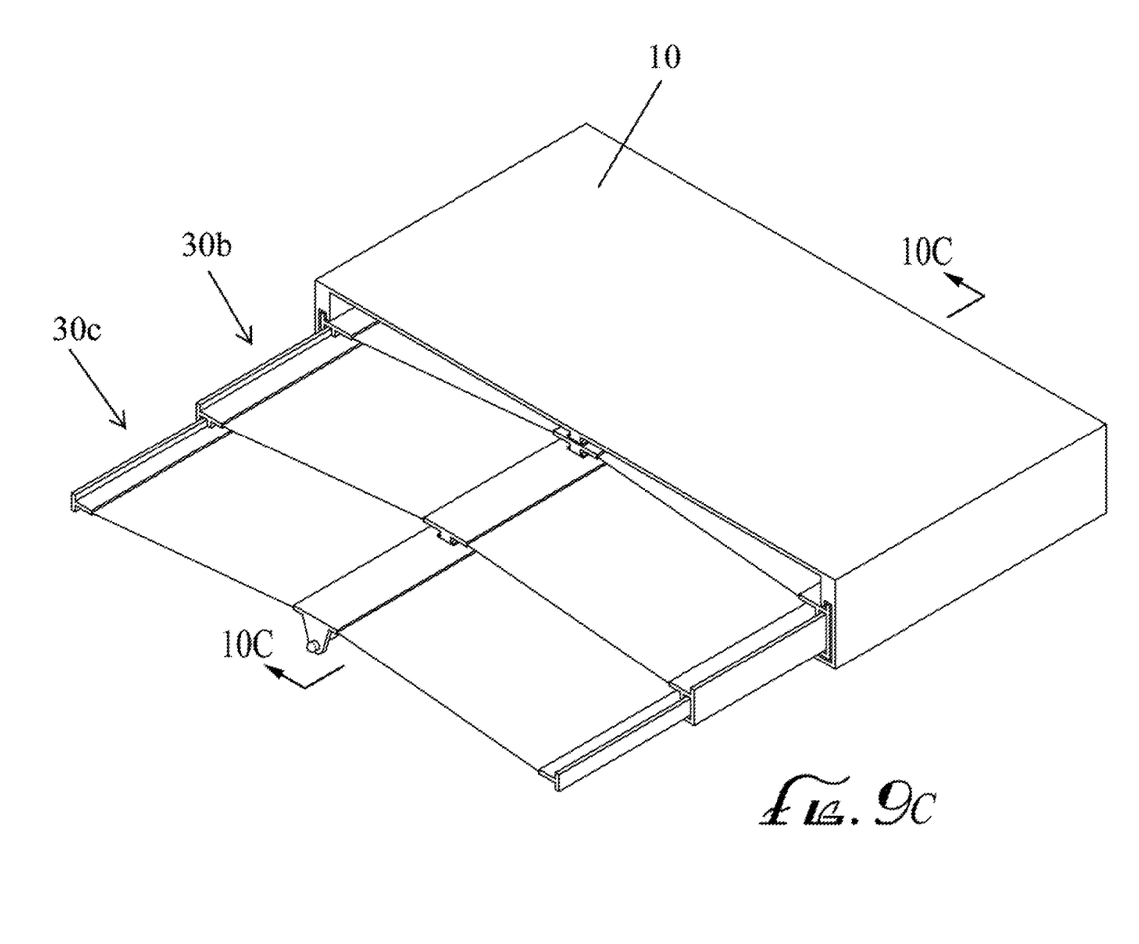
Figure 9D:
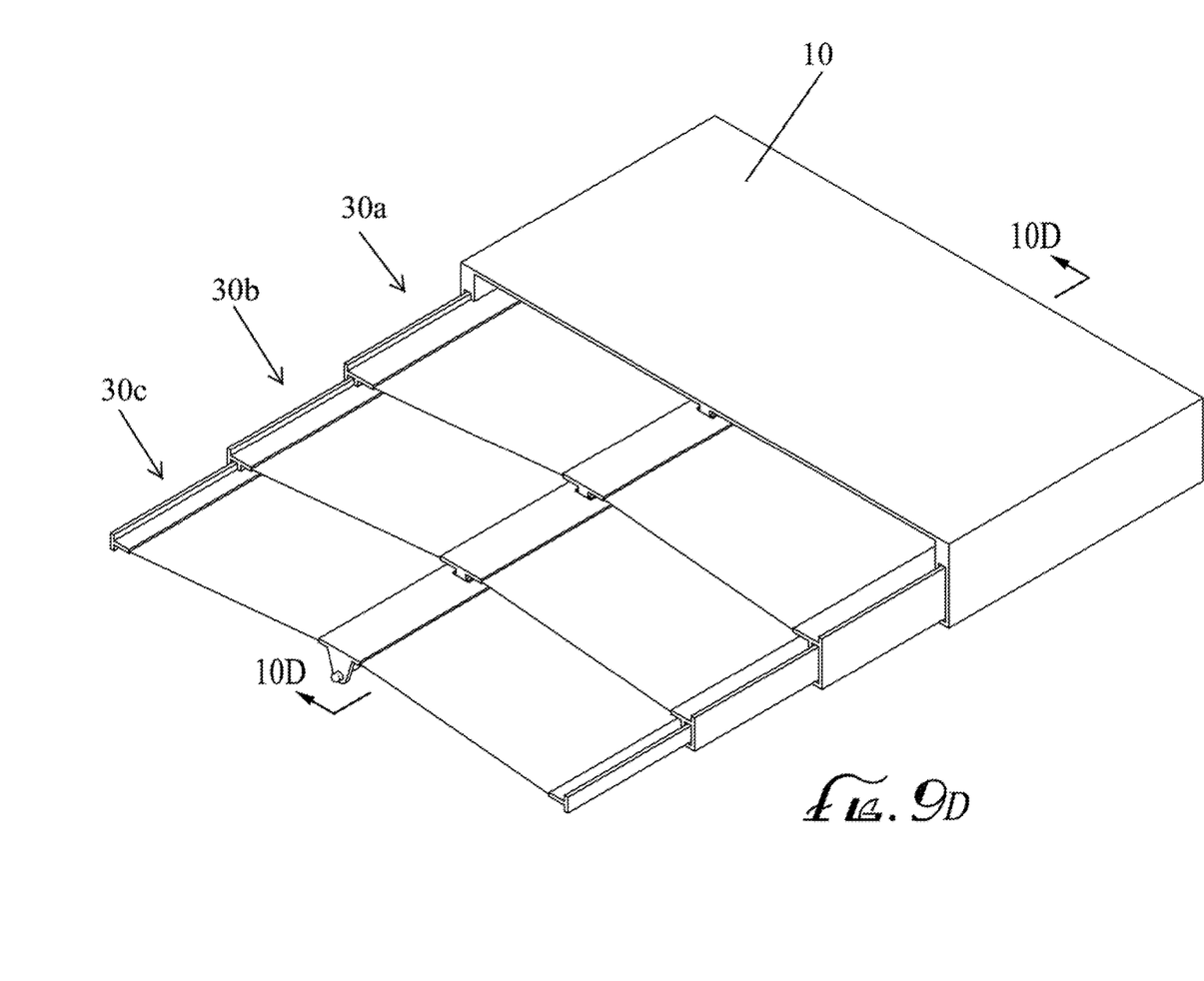

When the motor 20 is activated to displace the retractable shaft 25 in the forward direction, the engagement of the nut with the retractable shaft 25 induces the forward displacement of the lowermost frame 30c. Accordingly, the lowermost rails 31c, 32c, and 33c begin to displace out of the housing 10, as shown in FIG. 9b.

Figures 10A, 10B:
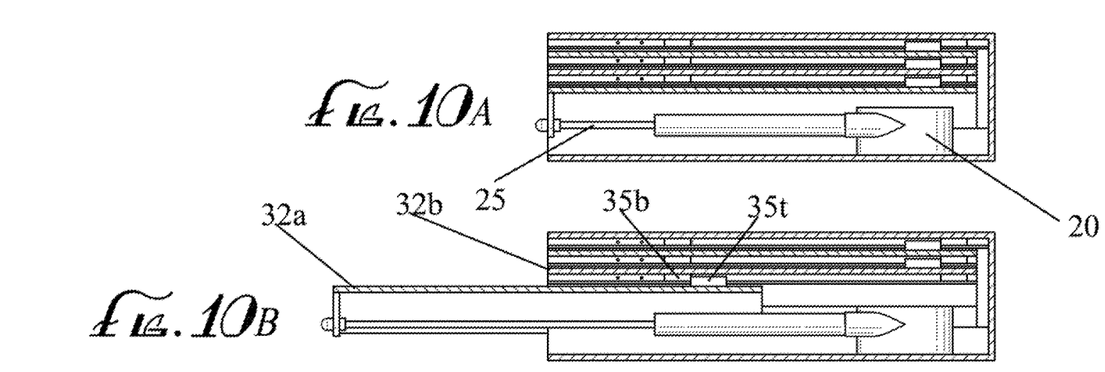
FIGS. 10a, 10b, 10c, 10d, and 10e show sectional views of the frames extending out of the housing one after the other as used in a retractable umbrella according to the present invention.
Figure 10C:
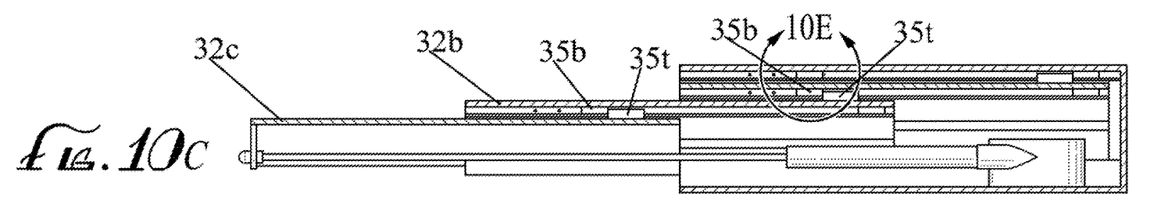
Figure 10D:
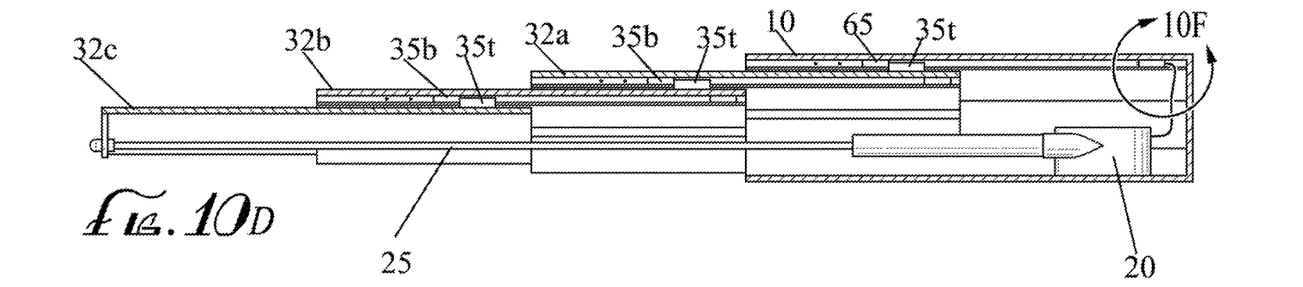
Figure 10E:
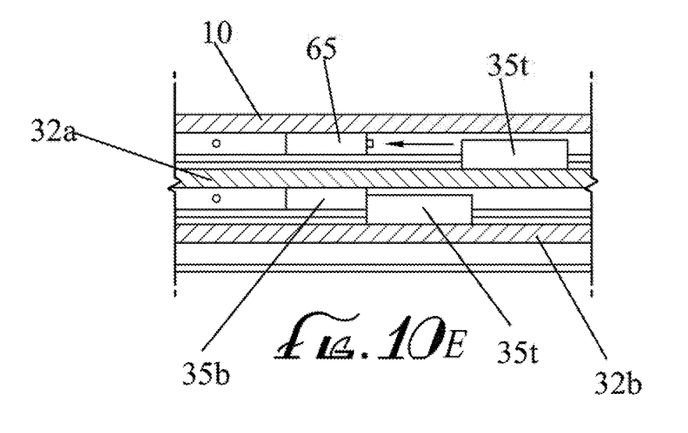
Figure 11:
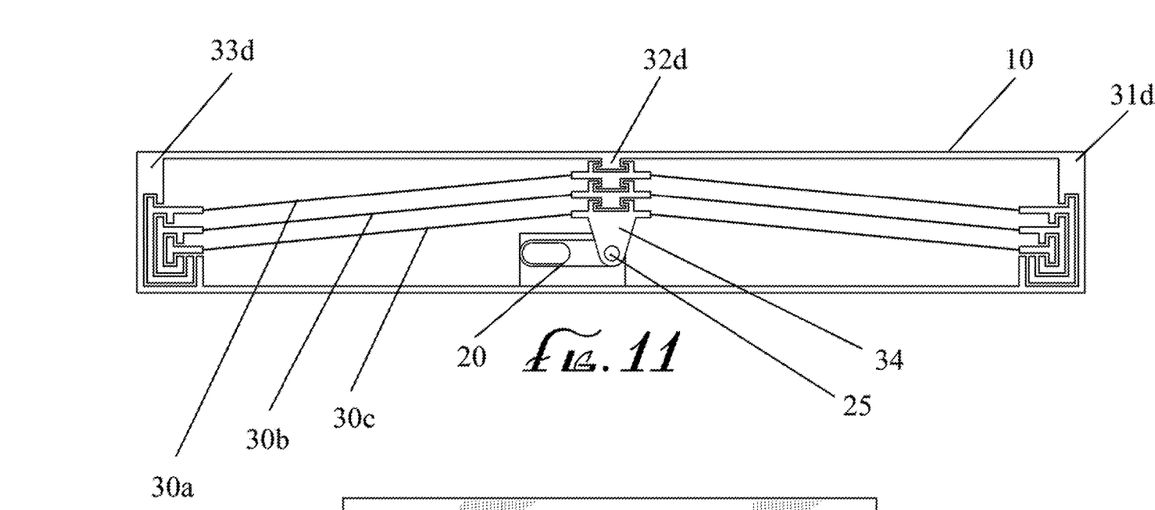
FIG. 11 shows a front view of the retractable umbrella according to the present invention.
Figure 12:
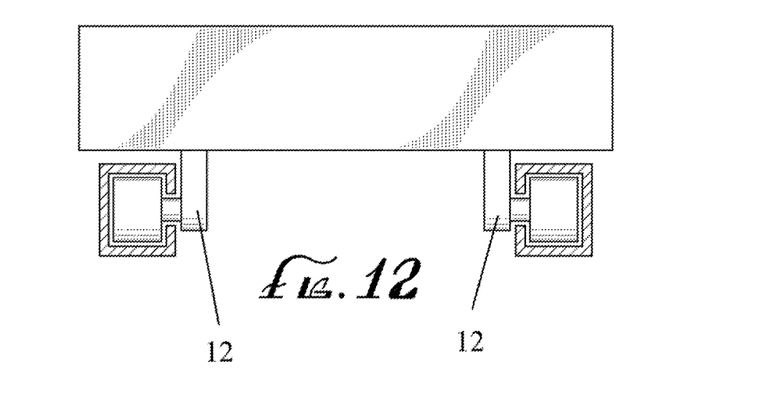
FIG. 12 shows a side view of the retractable umbrella according to the present invention attached to a vehicle.

As shown in FIG. 10a, at a predetermined distance along the lower center rail 32c and proximal to the motor 20, a top nub 35t protrudes upwardly. In addition, at a predetermined distance along the middle center rail 32b and distal to the motor 20, a bottom nub 35b is removably attached. As the lower center rail 32c is displaced forward by the displacement of the retractable shaft 25, the top nub 35t eventually engages the bottom nub 35b. As the lower center rail 32c continues to displace forward, the top nub 35t pushes against the bottom nub 35b so as to pull the middle center rail 32b and induce the forward displacement thereof out of the housing 10, as shown in FIG. 10b. Furthermore, at a predetermined distance along the middle center rail 32b and proximal to the motor 20, another top nub 35t protrudes upwardly. Additionally, at a predetermined distance along the top center rail 32a and distal to the motor 20, another bottom nub 35b is removably attached. As the middle center rail 32b is displaced forward by the engagement of the top nub 35t and the bottom nub 35b, the top nub 35t eventually engages the bottom nub 35b. As the lower center rail 32c and the middle center rail 32b continue to displace forward, the top nub 35t pushes against the bottom nub 35b so as to pull the top center rail 32a and induce the forward displacement thereof out of the housing 10, as shown in FIG. 10c. Finally, at a predetermined distance along the top center rail 32a and proximal to the motor 20, yet another top nub 35t protrudes upwardly. In addition, at a predetermined distance along the top of the housing 10, in line with the top nub 35t, and distal to the motor 20, a second switch 65 extends downwardly. As the top center rail 32a is displaced forward by the engagement of the top nub 35t and the bottom nub 35b, the top nub 35t eventually presses against the second switch 65 so as to deactivate the motor 20 and cease the displacement of the retractable shaft 25. Once the motor 20 is deactivated, the rails stop displacing. When the top nub 35t presses against the second switch 65, the rails are fully extended out of the housing 10 a predetermined distance that is sufficient to provide protection from the rain to the driver or passenger exiting or entering the vehicle 200 through the door 220, as shown in FIG. 10d.

Figure 3A:
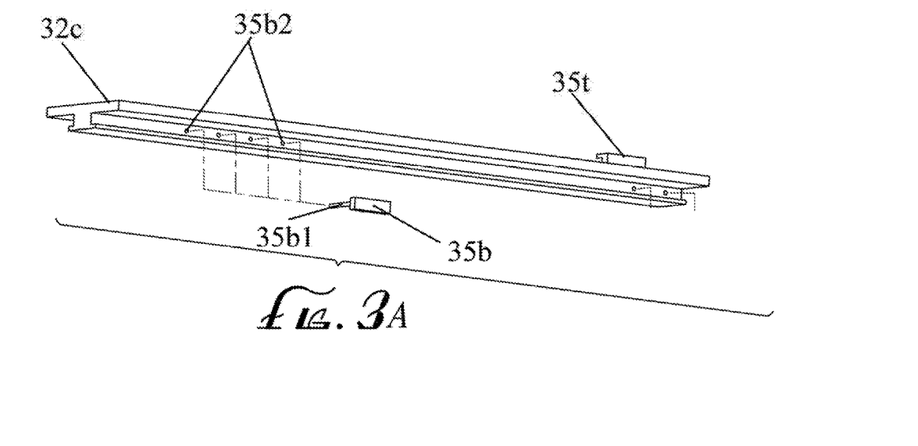
FIG. 3a shows a perspective view of the top and bottom nub removably attached to a rail.

As shown in FIG. 3a, the bottom nubs 35b are removably attached to a corresponding rail. The bottom nubs 35b have at least two posts 35b1 each of which are removably inserted into a hole 35b2 located along a corresponding rail. Thus, each bottom nub 35b can be removably placed at different places along the rail so as to define the amount of distance each rail is displaced.

When the driver or passenger is no longer in need of protection from the rain, the switch 60 is used to activate the motor 20 once again to induce the retraction of the retractable umbrella 100 back inside the housing 10. As the retractable shaft 25 is retracted back into the housing 10, the lower center rail 32c is displaced backward until the top nub 35t engages a bottom nub 35b in the rear of the middle center rail 32b so as to displace said middle center rail 32b backward. Then a top nub 35t engages in the middle center rail 32b engages a bottom nub in the rear of the top center rail 32a so as to displace said top center rail 32a backward until all rails and frames ha been retracted back into the housing 10.

It is understood that the described embodiments of the present invention are illustrative only, and that modifications thereof may occur to those skilled in the art. Accordingly, this invention is not to be regarded as limited to the embodiments disclosed, but to be limited only as defined by the appended claims herein.

What is claims is:
1. A retractable umbrella comprising:
a housing;
a plurality of frames to which an umbrella sheet is attached and having at least one rail;
a top nub attached to each rail;
a bottom nub attached to each rail;
wherein said frames nest within one another within said housing whereby a lowermost frame is nested below an uppermost frame;
a motor that linearly displaces a retractable shaft that is attached to said lowermost frame such that said lowermost frame is displaced linearly;

whereby the displacement of said lowermost frame induces the displacement of said plurality of frames through the interaction of said top nubs and bottom nubs;
a first switch that activates said motor; and
a second switch that deactivates said motor.

2. The retractable umbrella of claim 1 further comprising a plurality of guides within said housing that facilitate the displacement of said plurality of frames from said housing.

3. The retractable umbrella of claim 1 whereby said housing is removably attached to a vehicle.

4. The retractable umbrella of claim 1 whereby each of said frames comprise a plurality of umbrella sheets attached to a center rail at a first end while a second end is attached to either a right rail or a left rail.

5. The retractable umbrella of claim 1 whereby said bottom nub is removably attached to said rail so as to regulate the amount of distance said rail is displaced.

6. The retractable umbrella of claim 1 whereby said motor is within said housing.

* * * * *